Nov. 25, 1969    C. J. HIMEL    3,480,262
AIR CLEANING APPARATUS
Filed Feb. 16, 1968    3 Sheets-Sheet 1
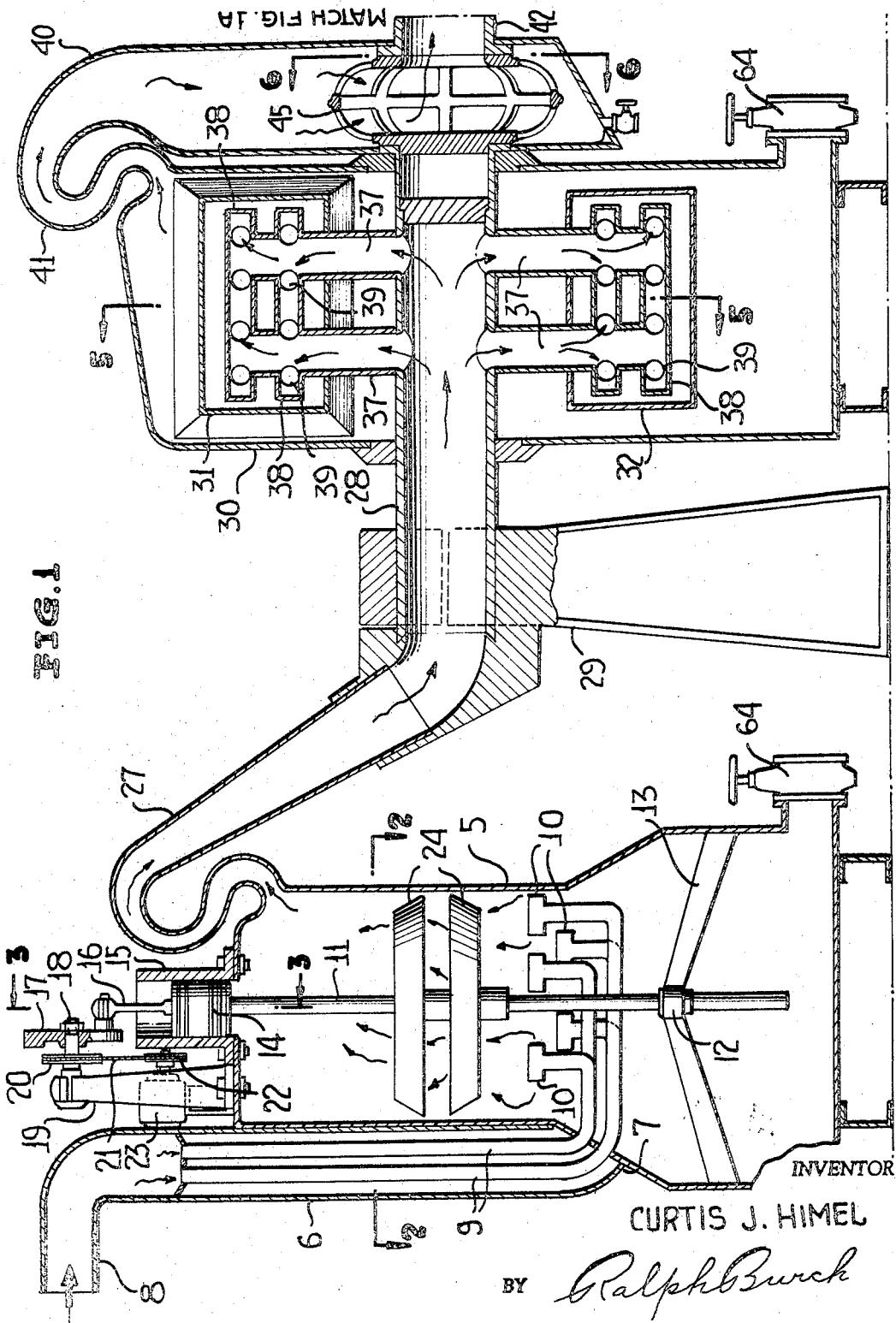
INVENTOR
CURTIS J. HIMEL
BY Ralph Burch
ATTORNEY

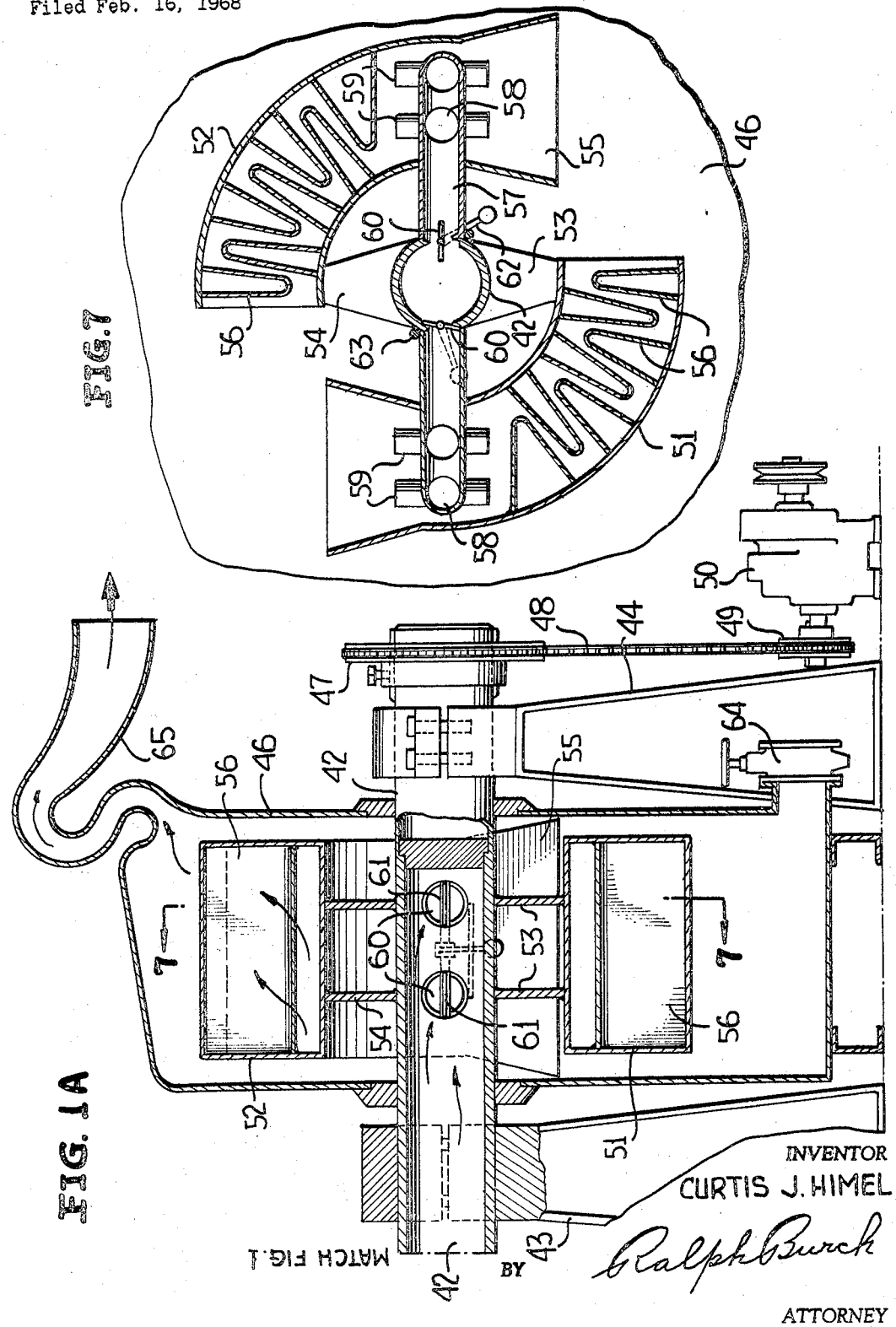

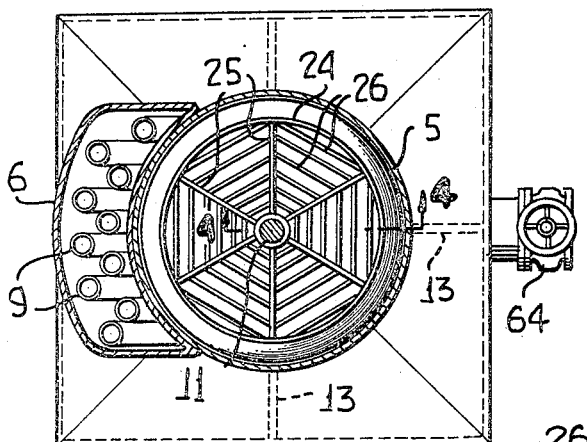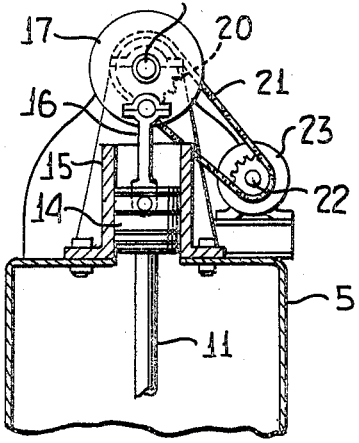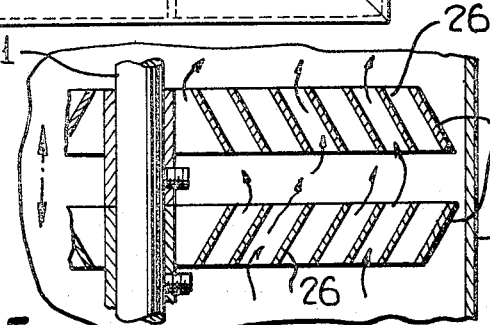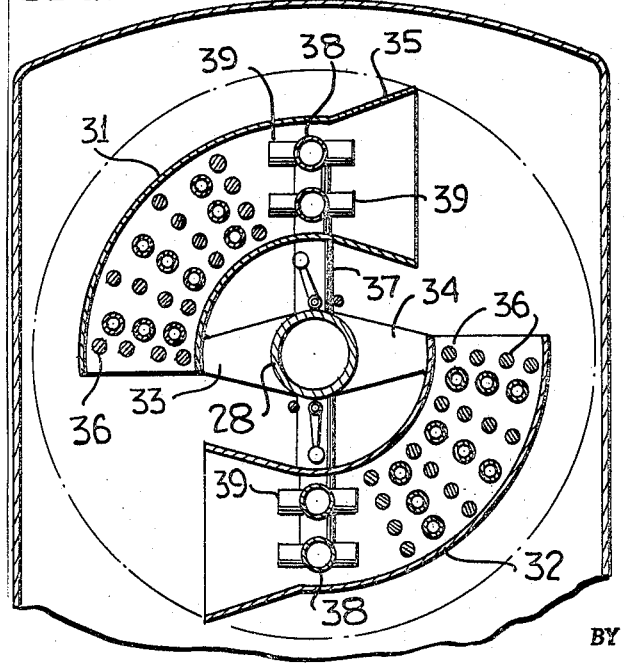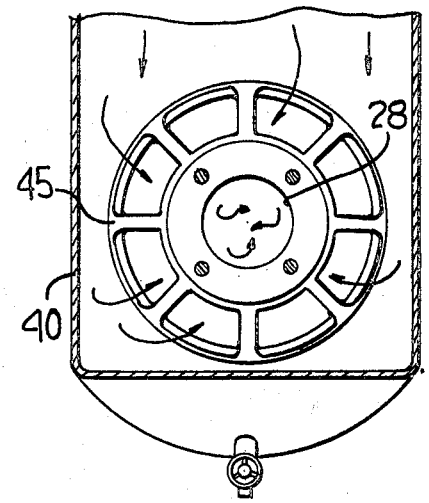

United States Patent Office 3,480,262
Patented Nov. 25, 1969

3,480,262
AIR CLEANING APPARATUS
Curtis Joseph Himel, 510 Belle Chasse Highway N.,
Belle Chasse, La. 70037
Filed Feb. 16, 1968, Ser. No. 706,137
Int. Cl. B01d 47/06
U.S. Cl. 261—22                                      7 Claims

ABSTRACT OF THE DISCLOSURE

An air cleaning and sterilizing apparatus comprising a series of tanks each containing a cleaning or sterilizing liquid, the first tank having a vertical reciprocating agitator and the second and third tanks having rotating arcuate tubular members having baffles therein and a rotating tubular shaft extending through the second and third tanks supporting said arcuate members having air ducts communicating with said arcuate members, the tubular shaft having connection with the air discharge conduit of the first tank.

---

The invention relates to an air cleaning and sterilizing apparatus for purifying air.

It is an object of the invention to provide a series of tanks each containing a cleaning or sterilizing liquid through which the air is drawn by suction, the first tank having reciprocating agitators to cause particles in the air to absorb the liquid and sink to the bottom of the tank and succeeding tanks having rotating arcuate tubular members through which the air and liquid is forced under pressure, the tubular members having baffles therein to create friction with the particles in the air and thus remove the same.

Other objects and advantages of the invention will be apparent during the course of the following specification.

In the accompanying drawings forming a part of this specification,

FIGS. 1 and 1A is a longitudinal sectional view of the apparatus,

FIG. 2 is a section taken on line 2—2 of FIG. 1,
FIG. 3 is a section taken on line 3—3 of FIG. 1,
FIG. 4 is a section taken on line 4—4 of FIG. 2,
FIG. 5 is a section taken on line 5—5 of FIG. 1,
FIG. 6 is a section taken on line 6—6 of FIG. 1, and
FIG. 7 is a section taken on line 7—7 of FIG. 1A.

Referring to the drawings, the numeral 5 designates a first cleaning tank having a vertical conduit 6 attached to its outer wall and having communication with the lower end of the tank, as at 7. The upper end 8 of the conduit extends at right angles and serves as an inlet for the air. A series of tubes 9 are disposed in the conduit 6 and the lower ends of the tubes extend into the lower end of the tank and are bent upwardly in spaced apart relation with T-shaped heads 10 at their discharge ends for dispersing the air in a lateral direction. A vertical reciprocating shaft 11 is disposed axially of the tank 5 having its lower end mounted in a bushing 12 supported by arms 13 extending from the walls of the tank. The upper end of shaft 11 is attached to the lower end of a plunger 14 mounted to reciprocate in a cylinder 15 mounted on top of the tank 5. A connecting rod 16 has one end pivotally connected to the upper end of the plunger 14 and its opposite end pivotally connected to a cam wheel 17 mounted on a shaft 18 supported by a bracket 19. A sprocket wheel 20 is mounted on shaft 18 and a chain 21 connects the sprocket wheel 20 with a smaller sprocket wheel 22 mounted on the shaft of a motor 23 which drives the sprocket wheels to rotate the cam wheel 17 and impart a reciprocating motion to the plunger 14 and thus reciprocate the shaft 11. A pair of agitators 24 are fixedly mounted on the shaft 11 in spaced relation. Each agitator comprises a circular ring having radial ribs 25 dividing the ring into segments and extending between the ribs are a series of spaced vanes 26 disposed at an angle to the vertical axis of the ring with the vanes of one agitator being at an angle opposite to the angle of the vanes of the other agitator. An outlet conduit 27 extends from the upper end of tank 5 being shaped like the neck of a swan with its discharge end in abutting relation to one end of a tubular air shaft 28 rotatably mounted in a supporting standard 29. The tubular shaft 28 extends transversely through a second cleaning tank 30 and mounted within the tank on opposite sides of shaft 28 are arcuate shaped tubular members 31 and 32 connected to the shaft by braces 33 and 34. The tubular members have one end flared, as at 35, and disposed in the opposite end of the tubular members are a series of transverse tubes 36 with some of the tubes being of larger diameter then the other tubes. Tubular air ducts 37 extend from the shaft 28 into the tubular members 31 and 32 adjacent the flared ends 35 and communicate with the transverse ducts 38 having a series of lateral discharge ports 39. A discharge conduit 40 extends from the top of tank 30 having a swan shaped neck 41, the conduit being disposed in parallel relation to the side of the tank with its lower end enclosing the end of tubular shaft 28. A second tubular shaft 42 is disposed in longitudinal alinement with the tubular shaft 28 being rotatably mounted in standards 43 and 44. One end of shaft 42 extends through the wall of conduit 40 and is coupled to the end of shaft 28 by a perforated coupling 45 which allows air in the conduit 40 to enter the shaft 42. The shaft 42 extends through a third tank 46 disposed between the standards 43 and 44 and mounted on its end is a sprocket wheel 47 connected by a chain 48 with the sprocket wheel 49 of a reduction gear mechanism 50 driven by a motor, not shown. Mounted on opposite sides of the shaft 42 within the tank 46 are arcuate shaped tubular members 51 and 52 which are supported in spaced relation to the shaft by braces 53 and 54 extending from the shaft 42. One end of the tubular members is flared, as at 55, and disposed in the opposite end of the members is a series of baffle plates 56 arranged to form a sinuous path for the passage of air through the members. Air ducts 57 extend from the tubular shaft 42 into the tubular members 51 and 52 and communicate with transverse ducts 58 having a series of lateral discharge ports 59. The passage of air from the shaft 42 through the ducts 57 is controlled by disk valves 60 mounted on a rotatable shaft 61 having ball levers 62 extending from the shaft which alternately open and close the ducts leading to the tubular members 51 and 52 as the shaft 42 rotates. Stops 63 limit the movement of the levers 62 to hold the valves in an open position. All the tanks are filled with water but if desired the third tank may contain a sterilizing chemical liquid. A drain valve 64 is provided at the bottom of each tank to drain off the liquid when cleaning the tanks. A discharge conduit 65 extends from the top of the third tank 46 and leads to a suction apparatus, not shown, for drawing air into the conduit 6 and through all the tanks.

In operation, as the air to be cleaned is drawn into the first tank 5, the air is subjected to a pounding action by the reciprocating action of the agitators 24 which causes particles in the air to absorb sufficient water so they will drop to the bottom of the tank. The air discharged from tank 5 enters the rotating tubular shaft 28 and is conducted by the ducts 37 to the rotating tubular members 31 and 32 mounted in the tank 30. The rotation of the members 31 and 32 causes the liquid and air to pass through the tubular members under pressure so that the baffle tubes 36 in the discharge end of the tubular members will remove particles from the air. Air discharged from the second tank is conveyed through the tubular shaft 42 and ducts 57 to the rotatable tubular members 51 and 52 disposed in the third tank 46 which may contain a cleaning or sterilizing liquid. As the air and liquid is forced through the tubular members 51 and 52 under pressure, a friction is created between the air and baffle plates 56 so that the air is thoroughly sterilized before being discharged into the atmosphere.

Having thus described my invention, I claim:

1. An air cleaning apparatus comprising a series of tanks containing a cleaning liquid, a reciprocating agitator mounted in the first tank, a rotatable tubular shaft having connection with said first tank for conducting air from said first tank through successive tanks, arcuate tubular members mounted around said tubular shaft to revolve in a circular path in the successive tanks, agitating baffles in said arcuate members, and means for conducting the air from said tubular shaft to said arcuate members.

2. An air cleaning apparatus as described in claim 1 including means for controlling the flow of air from said tubular shaft to said arcuate members.

3. An air cleaning apparatus as described in claim 1 wherein said tubular shaft is formed in two sections, a perforated coupling connecting the sections of the shaft together between two of the tanks and an air discharge conduit from one of the tanks enclosing said coupling.

4. An air cleaning apparatus as described in claim 1 wherein said first tank has a series of air inlet tubes having their discharge ends disposed beneath said agitator in spaced relation.

5. An air cleaning apparatus as described in claim 1 including means for rotating said tubular shaft.

6. An air cleaning apparatus comprising a series of tanks containing a cleaning liquid, means for conducting air through said tanks, a reciprocating agitator mounted in the first tank, arcuate tubular members rotatably mounted in successive tanks to revolve in a circular path, a series of air inlet tubes for introducing air into the first tank below said agitator, a rotatable tubular shaft supporting said arcuate tubular members, an air discharge conduit extending from the first tank and connected to said tubular shaft, air ducts extending between said tubular shaft and said arcuate members, baffles mounted in said arcuate members to form a sinuous path for the passage of air and liquid through said members, means for controlling the flow of air through said air ducts and means for rotating said tubular shaft.

7. An air cleaning apparatus comprising a series of tanks containing a cleaning liquid, a rotatable tubular shaft for conducting air through said tanks, arcuate tubular members supported by said shaft to revolve in a circular path within said tanks, baffles mounted in said arcuate members to form a sinuous path for the passage of air and liquid through said members and air ducts extending between said shaft and said arcuate members.

References Cited

UNITED STATES PATENTS

| | | | |
|---|---|---|---|
| 86,269 | 1/1869 | Baldwin | 259—140 |
| 104,127 | 6/1870 | Edgerton | 259—140 |
| 110,429 | 12/1870 | Brown | 259—140 |
| 199,450 | 1/1878 | Chandler et al. | 261—92 |
| 462,102 | 10/1891 | Schmid | 261—92 |
| 1,282,799 | 10/1918 | Frasch | 261—87 X |
| 1,779,181 | 10/1930 | McDonald | 261—87 |
| 3,206,172 | 9/1965 | Gaska et al. | 261—81 X |

FOREIGN PATENTS

| | | |
|---|---|---|
| 1,025,543 | 1/1953 | France. |

TIM R. MILES, Primary Examiner

U.S. Cl. X.R.

55—223, 247, 256; 259—113; 261—81, 87, 92